Sept. 18, 1956 C. R. BLYTH 2,763,799
COMMUTATOR AND MOUNTING THEREFOR
Filed June 18 1953
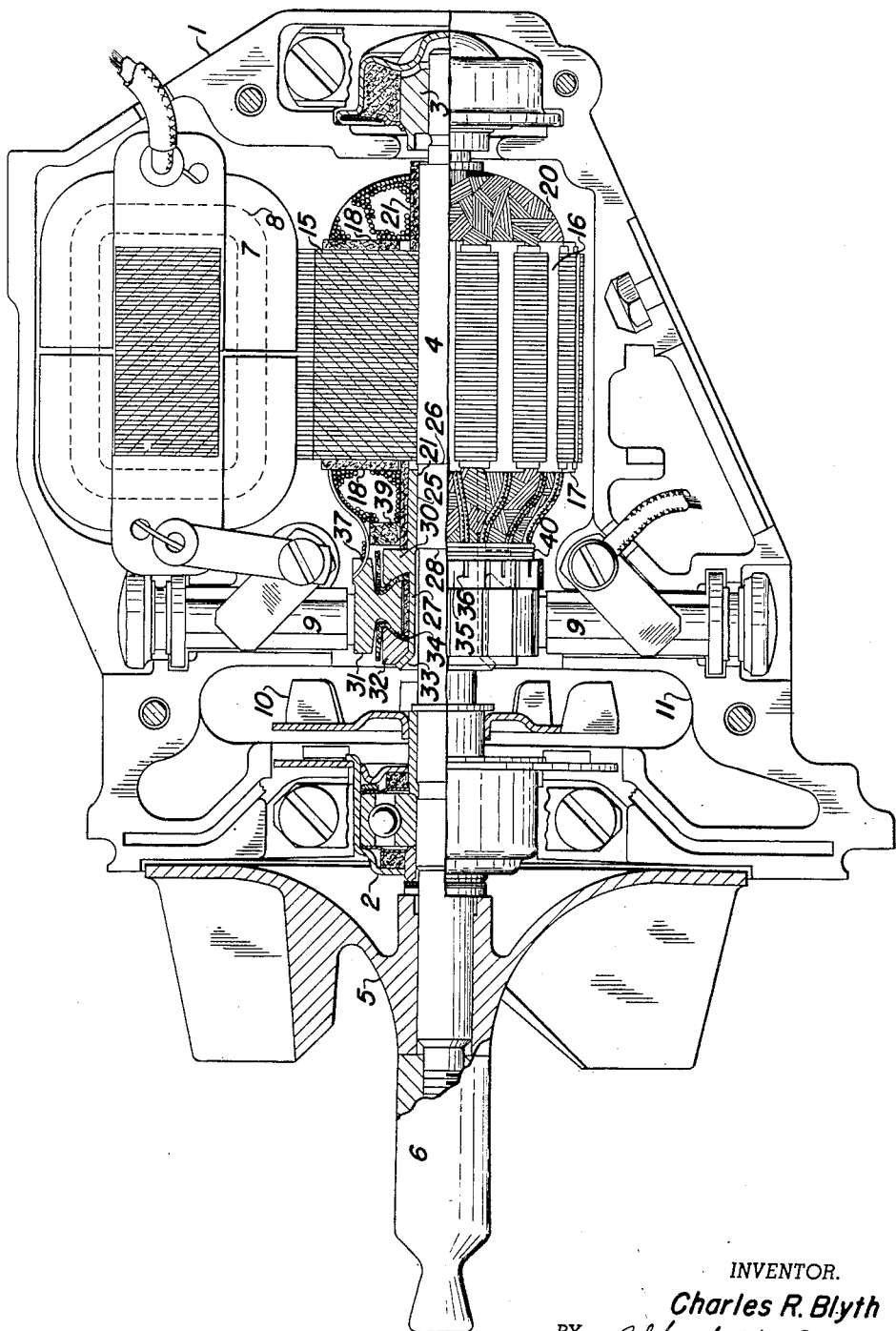
INVENTOR.
Charles R. Blyth
BY Alfred T. Gross
ATTORNEY.

United States Patent Office 2,763,799
Patented Sept. 18, 1956

2,763,799

COMMUTATOR AND MOUNTING THEREFOR

Charles R. Blyth, North Canton, Ohio, assignor to The Hoover Company, North Canton, Ohio, a corporation of Ohio Application June 18, 1953, Serial No. 362,582

3 Claims. (Cl. 310—236)

My invention relates to the art of electrical motors and is particularly designed to improve the commutator performance and to eliminate certain objections which have arisen with respect to small diameter high speed commutator motors.

In the operation of small diameter very high speed commutator motors, it has been found that the coil end connections between the commutator bars and the windings are subject to breakage after a short running period of the motor. Investigation has led to the discovery that such breakage is caused by movement of the commutator with respect to the armature iron which is caused by slight whipping action of the shaft at high speeds. This motion of the commutator with respect to the armature iron also interferes to some extent with the efficiency of commutation.

It is accordingly a principal object of my invention to provide an electric motor wherein the commutator is rigidly secured to the motor shaft adjacent a portion thereof not subject to whipping action at high speed and in which the commutator proper is spaced from that portion of the shaft which lies radially within the commutator.

It is a further object of my invention to provide an electric motor characterized by the provision of a shaft supported adjacent its ends by support and guide bearings wherein the motor structure fixed to the shaft creates a highly rigid structure tending to localize whipping of the shaft in portions thereof removed from the aforesaid rigid structure and in which certain portions of the motor structure which are necessarily spaced from the aforesaid rigid section of the motor proper are positioned around and in spaced relation to the shaft and are directly supported from the aforesaid rigid sections of the shaft.

It is a further object of my invention to provide an electric motor having armature laminations rigidly secured to the motor shaft, a commutator spaced axially of the shaft from one side of the laminations to provide space therebetween for armature winding end turns, and a commutator supporting device rigidly engaging and stiffening the shaft adjacent the laminations thereon and under the end turns and supporting the commutator proper out of contact with the motor shaft, whereby whipping of the shaft or any movement thereof is not significantly imparted to the commutator.

Other objects and advantages of this invention will become apparent as the description proceeds when taken in connection with the accompanying drawings wherein the single figure illustrates a sectional view through an electric motor structure embodying my invention.

Referring now to the drawing in detail, there is illustrated a small high speed electrical motor and its casing, showing the application of the same to the motor housing and fan structure of a suction cleaner, which is one of the applications of my invention requiring a small diameter high speed electrical motor which is rugged and has very long life.

The motor construction illustrated in the drawing is that generally disclosed in the application of John E. Vance, filed January 30, 1952, Serial No. 269,069 for Electric Motors. The present application differs from the motor structure disclosed in the aforesaid Vance application by the provision of a novel commutator and mounting structure therefor.

In the drawing, the reference character 1 designates generally one half of a split motor housing which also forms part of the frame of a suction cleaning device, for example, as set forth in the aforesaid Vance application. The frame 1 supports a ball bearing structure 2 at one end thereof and a sleeve bearing structure 3 at the other end thereof within which there is mounted an elongated motor shaft 4, having a portion thereof projecting through and beyond the ball bearing 2 and carrying a suction air fan 5 and pulley 6 which is adapted to be connected to drive a rotary brush or the like in a suction cleaner, and is therefore subjected to a side thrust such as is commonly developed by belt drives.

The housing 1 also encases a U-shaped type motor field structure generally designated by the reference character 7 having a single coil winding 8 wrapped about the bight portion thereof. The housing 1 also supports motor brush structures indicated generally by the reference character 9 which are adapted to bear upon and make connection with a commutating structure to be described hereinafter. A small ventilating fan 10 is mounted upon the shaft 4 adjacent the ball bearing 2 and runs in a ventilating fan housing 11 which is formed in the casing 1.

A plurality of armature laminations 15 are press fitted on the shaft 4 adjacent the bearing structure 3. The press fitting of the laminations 15 upon the shaft 4 renders this portion thereof very rigid. The laminations 15 are provided with conventional winding slots 16 which are closed by conventional slot wedges 17 to overlie conventional motor windings therein applied. As is usual in motors of this type, end plates of insulating material 18 are mounted at opposite axial ends of the lamination stack and serve to space the end turns 20 of the motor winding structure from the end faces of the metallic lamination stack. As is customary and conventional in motors of this type, the end turns 20 occupy a considerable axial length along the motor shaft at opposite ends of the lamination stack. The end turns 20 adjacent the bearing structure 3 are insulated from the shaft 4 by means of a sleeve 21 of insulating material. The end turns 20 at the left hand end of the lamination stack, as viewed in the drawing, surround an insulating sleeve structure 21 in order to insulate the end turns from the shaft and certain portions of the commutator structure to be described hereinafter.

My commutator structure comprises a mounting sleeve portion 25 press fitted on a portion of the shaft 4 adjacent the lamination stack 15 and having a slightly lesser diameter than the portion of the shaft engaging the laminations to form a shallow shoulder 26, which shoulder serves to prevent accidental pressing of the sleeve 25 against the laminations. As is apparent from the drawing, the sleeve 25 carries a commutator carrying extension cylinder 27 which projects axially of the shaft 4 away from the lamination stack 15 and in spaced relation to the shaft 4. That portion of the shaft 4 underlying the cylinder 27 is slightly reduced in diameter from the portion thereof which engages the sleeve 25, as indicated by the small shoulder 28. It is within the purview of my invention, however, to dispense with the shoulder 28, as it is only necessary that the cylinder 27 surround and be spaced from that portion of the shaft 4 radially thereunder.

A commutator locking V-ring 30 is attached to the sleeve structure 25—27 adjacent the junction point thereof. As illustrated, the V-ring 30 is integral with the sleeve structure, but it is within the purview of the invention to make this element as a separate part and to secure it to the sleeve structure by any suitable means. A conventional commutator bar and segment annulus indicated generally by the reference character 31 surrounds the section 27 and is urged against the V-ring 30 by means of a separate V-ring 32 forced toward the bar and segment section 31 by peening or riveting over the end of the section 27 as indicated at 33. Insulating rings 34 are mounted between the commutator bar and segment section 31 and each of the V-rings to insulate the current carrying portions thereof from the mounting structure.

In the illustrated embodiment of the invention, each of the conductor bar sections of the commutator structure is provided with a slightly enlarged diameter portion 35, and each conductor bar has a slot 36 adapted to receive the bared ends of one of the winding coil end connector leads indicated at 37. Preferably the leads 37 after being placed in the slot 36 will be soldered therein to provide a firm mechanical anchorage and a good electrical connection between the commutator bars and leads. An insulating ring 39 is mounted on the insulating sleeve 21 adjacent the V-ring 30 to protect the end turns 20 from contact with the V-ring. The connecting leads 37 overlie the periphery of the ring 39 and are held against movement by means of wrapping strings indicated at 40.

In the foregoing construction, the sleeve 25 which is press fitted on the shaft 4 closely adjacent the portion thereof carrying the laminations 15 is secured to the shaft at a very rigid portion thereof and in itself serves to strengthen and rigidify the shaft at this point.

The construction herein described and illustrated provides a motor which may be operated at extremely high speeds without weakening or breaking commutator connections and without interfering with the commutating action due to the small shaft whip which is practically inevitable in such devices. The portions of the shaft upon which the commutator supporting sleeve 25 and lamination stack 15 are mounted form a structure of extreme rigidity so that any shaft whip which may occur will occur at points removed from these elements where the shaft structure is less rigid. Since the commutator proper is carried by the aforesaid highly rigid portions of the shaft and is spaced from the weaker portions of the shaft subject to whip, the commutator is substantially isolated from the whipping effect and in particular does not move relative to the lamination stack and armature end turns and coil end connectors so that the coil end connector leads are not subjected to repeated high frequency strains and are not readily broken.

The foregoing construction is advantageous over prior constructions, particularly with respect to the stresses to which the armature leads are subjected, in that it has been customary in prior constructions to press the sleeve 27 directly onto the shaft, resulting in an appreciable stiffening of the shaft directly under the commutator. This construction produced a shaft having a very rigid section under the commutator, a very rigid section at the armature laminations, and a comparatively weakened section between the two. Consequently, unbalances and vibration forces present in the apparatus would tend to cause relative movement between these parts and thus subject the armature leads, which bridge the two rigid sections of the shaft across the weakened section thereof, to a high frequency vibratory movement resulting in breakage.

In the illustrated embodiment of the invention, the sleeve 27 and shaft 4 are both relieved where they are radially juxtaposed. It is, however, within the spirit of the invention to provide the spacing between the sleeve 27 and shaft 4 solely by relieving the shaft or solely by relieving the sleeve 27 as may be desired. In either event, the commuator will be mounted upon a rigid portion of the shaft closely adjacent the lamination stack and will be supported in spaced relation to the less rigid portions of the shaft which are likely to whip and move in operation.

While I have illustrated and described the invention in considerable detail, it is to be understood that various changes may be made in the arrangement, proportion and construction of parts without departing from the spirit of the invention or the scope of the appended claims.

I claim:

1. In an electric motor, an armature comprising a shaft, laminations secured to the shaft, a commutator structure secured to the shaft having a mounting portion secured to the shaft adjacent the laminations and a commutating section projecting from the mounting section in spaced relation to the laminations and axially of and in spaced relation to the shaft whereby the commutating section is supported solely from the portion of the shaft adjacent the laminations and is isolated from vibrations and flexures of the portion of the shaft within the commutating section, windings applied to the laminations having end turns lying in the space between the commutating section and the laminations around the mounting portion, and end connections from the winding to the commutating section whereby flexure of the shaft at points spaced from the laminations is not imparted to the commutating section.

2. In an electric motor having a frame, a field structure supported by the frame, bearings supported by the frame, a shaft rotatably mounted in the bearings, armature laminations secured to the shaft between the bearings, and armature windings applied to the laminations having end turns extending axially of the shaft from opposite ends of the laminations, the combination of a commutator supporting member secured to and reinforcing the shaft adjacent the laminations and underlying the winding end turns at one end of the laminations, a commutator structure projecting from the supporting member axially of the shaft away from the laminations and surrounding the shaft in radially spaced relation thereto, the supporting member forming the sole connection between the commutator structure and the shaft whereby the commutator structure is directly united to the reinforced portion of the shaft adjacent the laminations and is not moved relative to the laminations by vibration or flexure of the unreinforced portions of the shaft surrounded by the commutator structure, and coil end connectors from the windings spanning the reinforced portion of the shaft and connected to the commutator.

3. In an electric motor having a frame and a field structure and bearings supported by the frame, the combination of a motor shaft rotatably mounted in the bearings, armature laminations mounted on the shaft between the bearings adjacent the field structure, a commutator support ring engaging and reinforcing the shaft adjacent the laminations, a commutator structure carried by the support ring and projecting axially of the shaft in radially spaced relation thereto away from the laminations, the support ring forming the sole connection from the shaft to the commutator structure and the portion of the shaft surrounded by the commutator structure being of lesser diameter than the portions thereof engaged by the laminations and support ring whereby shaft flexures and vibrations will tend to localize in the reduced diameter portion thereof and will not move the commutator relative to the laminations, armature windings applied to the laminations having end turns extending axially of the shaft at opposite ends of the laminations and surrounding the mounting ring at the commutator end of the laminations, and coil end connectors from the windings to the commutator structure spanning the reinforced portion of the shaft.

References Cited in the file of this patent

UNITED STATES PATENTS

| | | |
|---|---|---|
| 998,386 | Parsons | July 18, 1911 |
| 1,145,594 | Kennedy | July 6, 1915 |
| 1,262,264 | Sammarone | Apr. 9, 1918 |
| 1,270,967 | Mizer | July 2, 1918 |
| 1,271,374 | Sammarone | July 2, 1918 |

FOREIGN PATENTS

| | | |
|---|---|---|
| 146,553 | Germany | Nov. 30, 1903 |